United States Patent [19]

Moyer et al.

[11] 3,896,429

[45] July 22, 1975

[54] SEGMENT DECODER FOR NUMERIC DISPLAY

[75] Inventors: Norman E. Moyer, Newport Beach; Dennis E. Walker, Costa Mesa, both of Calif.

[73] Assignee: Hughes Aircraft Company, Culver City, Calif.

[22] Filed: June 25, 1973

[21] Appl. No.: 373,569

[52] U.S. Cl. .......................... 340/336; 340/166 EL

[51] Int. Cl.² .......................................... G09F 9/32

[58] Field of Search .......... 340/336, 324 M, 324 R, 340/166 EL; 78/30

[56] References Cited

UNITED STATES PATENTS

| | | | |
|---|---|---|---|
| 3,204,234 | 8/1965 | Nakauchi | 340/336 |
| 3,400,388 | 9/1968 | Blank | 340/336 |
| 3,541,543 | 11/1970 | Crawford et al. | 340/166 EL |

*Primary Examiner*—Marshall M. Curtis
*Attorney, Agent, or Firm*—Richard J. Rengel; W. H. MacAllister

[57] ABSTRACT

Decoder logic is limited to decoding of BCD digital signals to a seven segment code for numeric characters. Intermediate stages of decoding are utilized and complex MOS implemented gates reduce the logical circuitry for digital display of numeric characters by energizing segments of a seven segment display device.

10 Claims, 8 Drawing Figures

SEGMENT DECODER FOR NUMERIC DISPLAY

BACKGROUND OF THE INVENTION

In electronic watches, calculators and other devices in which a numeric display is desired, the numeric data to be displayed is contained in a counter register, for example, which provides a binary-coded-decimal (BCD) output which is decoded to selectively energize segments for display of the coded numeric character. In prior BCD to seven segment decoders, the BCD signal outputs are decoded to generate decimal signals and the decimal signals are decoded to generate the seven segment signals. The BCD to decimal decoders involves a stage of decoding which utilize 10 four-input gates of a BCD decoder to produce the decimal outputs 0–9 and these ten outputs are used as inputs to seven decoder logic gates of the decimal to seven segment decoder. The BCD to decimal to seven segment decoding has been found to require over 100 MOSFET devices and nine auxiliary signals.

SUMMARY OF THE INVENTION

The present invention is a BCD to seven segment decoder for a numeric display comprising a network of logic gates that converts BCD input signals directly into seven segment signals for numeric readout display of numbers for a variety of electronic devices. The decoder is particularly adapted to those devices using PMOS or CMOS integrated circuits. Some of the more important advantages are in the reduction of the number of logic gates, simplification of decoder interconnections and reducing the number of MOSFETS to approximately one-half of the prior art arrangement discussed supra. For an individual numeric character, the four BCD signals, with inversion where necessary, are are applied to three intermediate logic gates to provide intermediate output signals 4, 01, 7. In combination with intermediate signals, or a combination of decoded segment outputs, intermediate signals and BCD signals; the decoded segment outputs are generated for display of numeric characters by selective energization of the seven segments of the numeric display device or indicator.

Accordingly it is the object of the present invention to provide an improved decoder according to the foregoing discussion.

Other objects and features of the invention will become apparent to those skilled in the art as disclosure is made in the following detailed description of the preferred embodiments of the invention.

DESCRIPTION OF PREFERRED EMBODIMENTS

Figure 1:
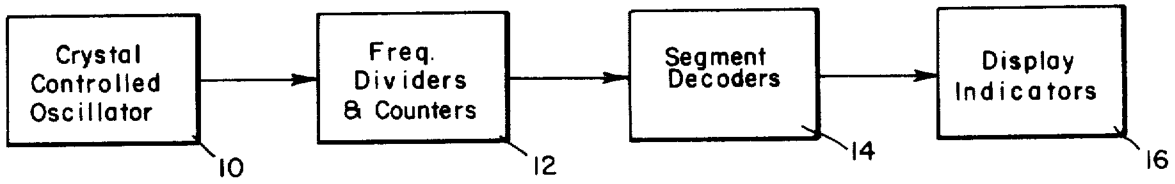
FIG. 1 is a block diagram of an electronic watch including a decoder of the invention providing outputs for display indicators.

Referring now to FIG. 1 for a more detailed description of the preferred embodiment, an electronic watch having a digital display is shown in block diagram to include high frequency crystal controlled oscillator 10 which is lowered in frequency by frequency dividers and BCD counters 12 providing a binary-coded-decimal outputs to the decoders 14 for seven segment decoded outputs to the indicators 16.

Figure 2:
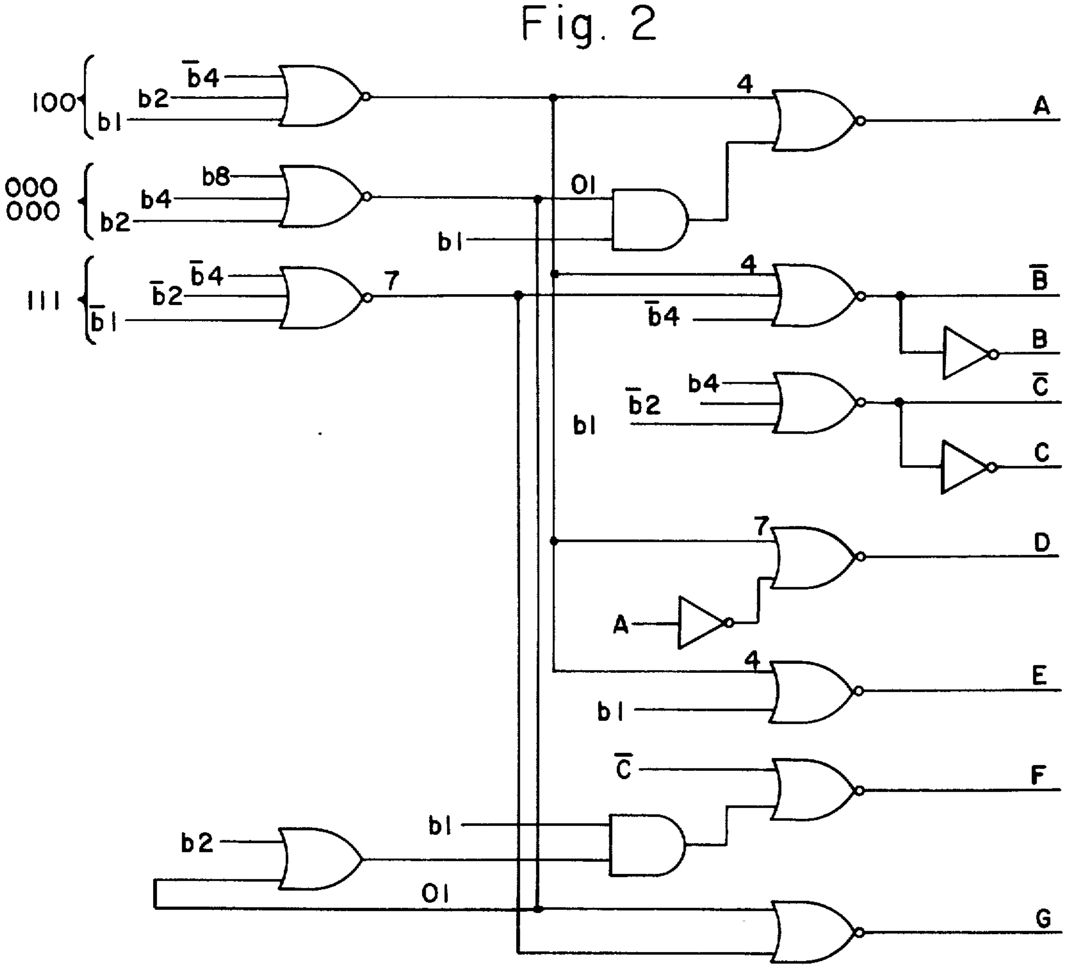
FIG. 2 is a schematic diagram of the decoder of the preferred embodiment of the invention for converting binary coded decimal signals to seven segment code for corresponding segments of the display device shown in FIG. 1.

Referring now to FIG. 2, one of the decoders 14 is shown for decoding of BCD signals supplied by a counter register to the seven segment decoder to provide outputs for display of numeric characters by energization of selected ones of the seven segments of one of the character indicators located in the digital display 16 of FIG. 1.

Figure 3:
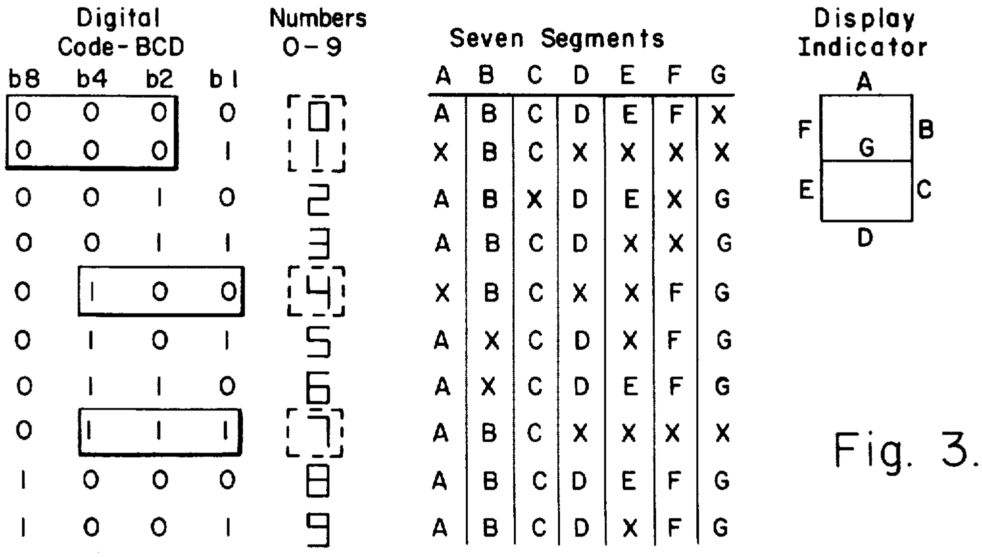
FIG. 3 is a table for corresponding codes for numbers capable of being displayed by the display device having segments A through G.

A typical display indication is shown in FIG. 3 to illustrate the locations of the individual segments A through G. These segments A–G correspond to the outputs A–G of the decoders shown in FIGS. 2 and 4 although it should be realized that the outputs of the segment decoder are more often applied to buffering drivers than directly connected to segments of the display.

In FIG. 2 binary-coded-decimal signals are applied to three logical NOR gates of an intermediate logic stage to provide intermediate output signals for the numbers 4, 0 or 1, and 7. In the following stage, these three intermediate outputs, 4, 01, 7 are used in combination with BCD signals, their inverses and outputs of logical gates of the final stage to provide the seven segment outputs A through G inclusive.

Figure 4:
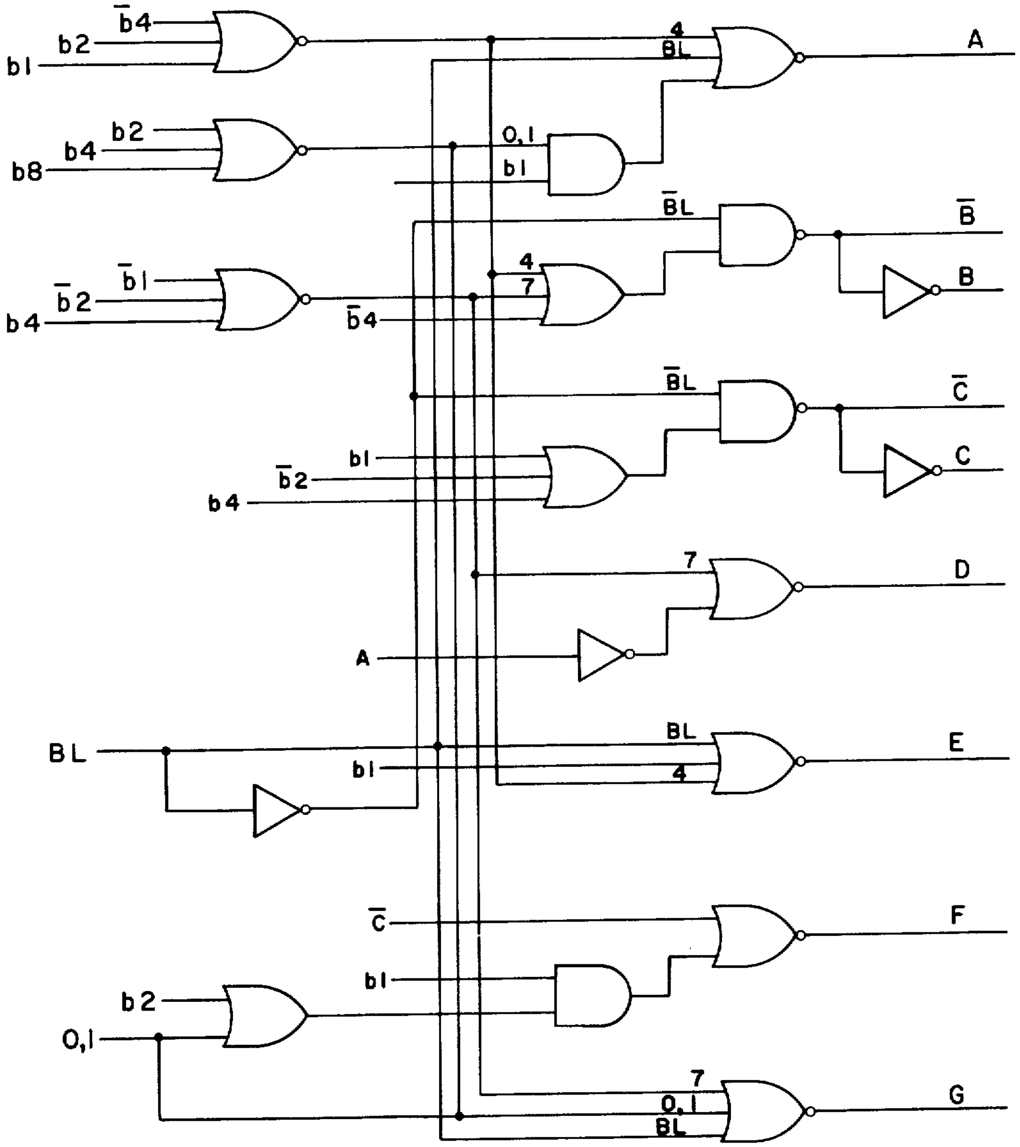
FIG. 4 is a schematic diagram of an alternate preferred embodiment of the present invention.
Figure 5A:
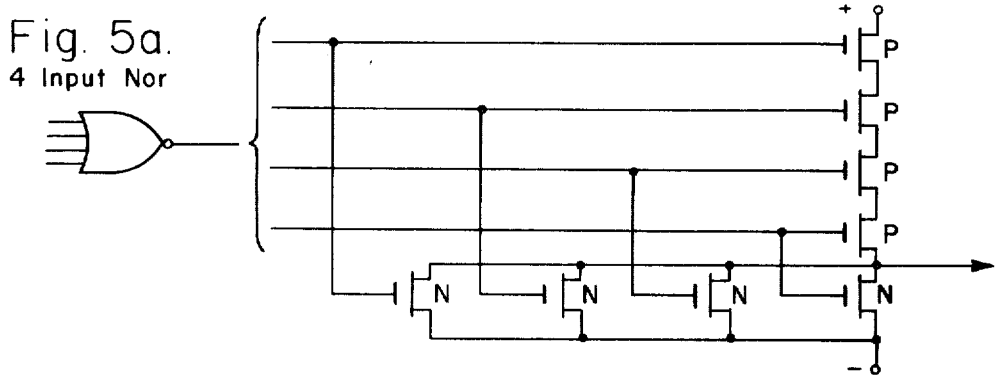
FIGS. 5*a*, 5*b*, and 5*c* are schematic circuit diagrams of four input logical gates particularly suited to MOS implementation.
Figure 5B:
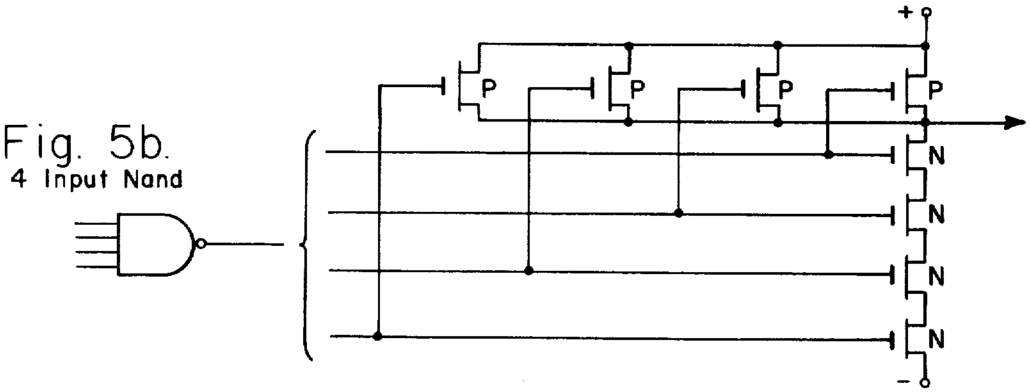
Figure 5C:
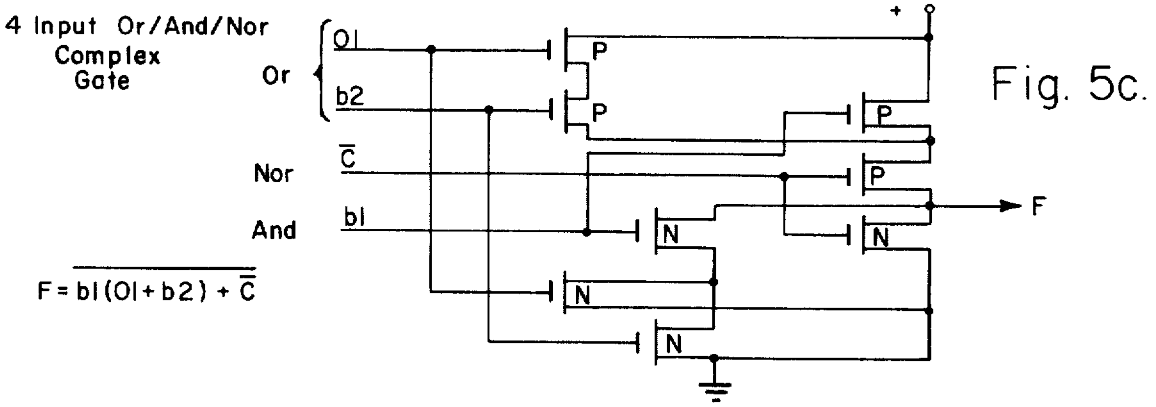
Figure 6:
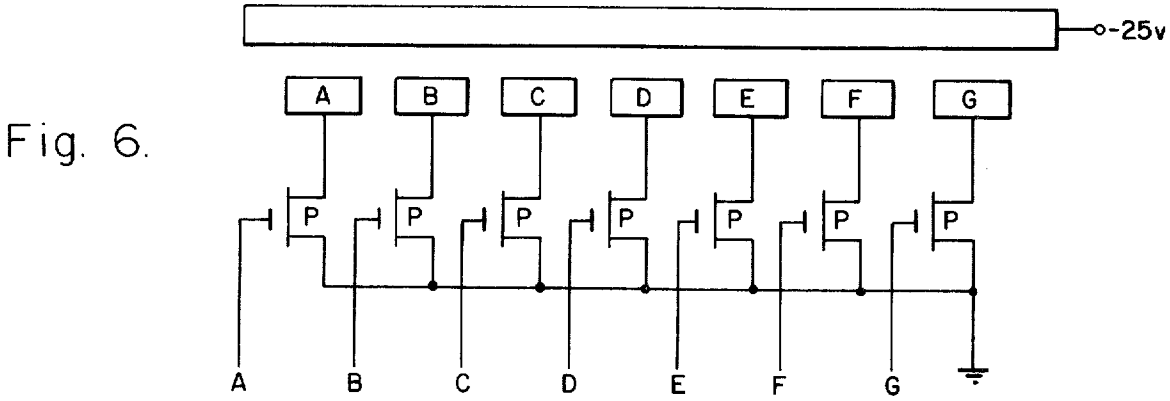
FIG. 6 is a schematic circuit diagram of a specific seven segment display device as provided by a cold cathode fluorescent tube.

The logic of the decoders of FIGS. 2 and 4 assume no input signals corresponding to decimal states 10 through 15. Much of the efficiency of the decoders in the present invention arise from complex gate structures, which are particularly suited to MOS implementation. A complex gate, for example, segment F gate, has the same number of MOSFETS as simple NOR or NAND gates with the same number of inputs. This complex gate for output F is shown in greater detail in FIG. 5c. In general, complex gates include OR, AND and NOR or NAND gates as shown in FIGS. 2 and 4.

In operation, the seven segment decoder shown in FIG. 2, provides the BCD input 0100 to the first NOR gate to provide a high level output for number 4. Intermediate logic gate having the output 01 utilizes the higher order bits *b*8, *b*4, *b*2 as shown by the Table of FIG. 3. The intermediate output of the decoder for number 7 is provided by the BCD counter output 0111 and utilizing the lower order bits *b*4, *b*2, *b*1.

The outputs of the intermediate logic gates 4, 01 and 7 are decoded because they are outputs particularly useful because they cause a larger number of segments of the display to be turned off. Intermediate outputs 4, 01, 7 are combined with other BCD signals and segment outputs to produce the segment decoder outputs A–G for the seven segments A through G.

Referring now to the logical gate of the final stage having the segment output A, this gate is a complex gate having only three inputs, namely intermediate signals 01 and 4, and BCD signal $b1$. Segment A is energized except for numbers 4 and 1, hence its controlling gate's output must be high except for 1 and 4. Accordingly, high logical level inputs to the NOR gate for numbers 4 and 1 only are provided directly for 4, and from the AND gate for 1. A high logical level input for $b1$ and a high level 01 will produce a high level output from the AND gate and thus a high level input to the NOR gate to produce a low level output from the final stage for segment A. This AND gate can have a high level output only for 1. Referring to FIG. 3, the columns under Seven Segments indicate that segment A is not energized for numbers 1 and 4. Accordingly, the decoder of FIG. 2 provides a high level output for energization of segment A for all numbers except 1 and 4.

Continuing the description of the decoder of FIG. 2, the logical gates having final outputs B, C, D, E, and G are similarly operative to provide for energization of the segments, as indicated in the columns under the heading Seven Segments in the Table of FIG. 3. Final output $\overline{B}$, for example, provides high level output for numbers 5 and 6, and this output inverted provides a high level output B for energizing segment B for numbers 0–4 and 7–9 inclusive. Similarly, decoder output $\overline{C}$ provides a high level output only for BCD inputs for the number 2. Output $\overline{C}$ inverted provides a high level output for all numbers except 2 as indicated by the Table of FIG. 3.

Output of NOR gate for segment D is low level for numbers 1, 4 and 7. Decoder output A inverted provides the high level input condition necessary to turn off segment D for numbers 1 and 4. Intermediate logical signal 7 provides a high level input for de-energization of segment D for number 7.

The decoded output E, for energization of corresponding segment E, utilizes a two input logical NOR gate having inputs 4 and $b1$. Low level signal at input $b1$ is provided for numbers 0, 2, 4, 6 and 8. High level input from output 4 eliminates number 4 from the high level outputs provided for the output E. Thus, segment E is energized for 0. 2, 6 and 8.

Decoded output for character segment F is provided by inputs to the corresponding NOR gate in the final stage of the decoder including input $\overline{C}$ which is derived from the output of the logical gate having a high output $\overline{C}$ when number 2 is present. When either input to the NOR gate for segment F is high, the output is LOW and segment F is de-energized. Thus, a high output $\overline{C}$ will de-energize segment F for number 2. The other input to the NOR gate for segment F eliminates numbers 1, 3, 7 by providing a high level output in response to inputs $b1$ and the output of OR gate having inputs ($b2$ + 01). These are the OR/AND gates of the final stage which have a high output to NOR gate of segment F when $b1$ input is high for odd numbers 1, 3, 5, 7, 9 and either 01 is high or G2 is high for numbers 2, 3, 6, 7. As a result of the foregoing, the NOR gate output is low and segment F de-energized for numbers 1, 3, 7 because of OR/AND gates input. This final stage of the decoder logic for output F is the complex gate illustrated in FIG. 5$c$ having the equation $F = \overline{b1(01+b2)+\overline{C}}$. Accordingly, a high level output for segment F is provided for numbers 0, 4, 5, 6, 8 and 9.

Also as shown in FIG. 2, decoder output G is the output of the logic NOR gate having inputs from intermediate logical gates for numbers 0, 1, 7. Thus, High level inputs to the logical NOR gate for numbers 0, 1, 7 will produce a low logic level output to de-energize segment G as indicated in the column G of FIG. 3; and a high logical level output for energization of the remainder of the characters 2 to 6, 8 and 9.

Referring now to FIG. 4, the segment decoder of FIG. 2 is substantially the same as shown in FIG. 4 except that the blanking signals BL and $\overline{BL}$ are utilized to blank out the entire 7 segment display as desired. Because of the additional inputs BL and $\overline{BL}$, more complex gates and multi-input gates are provided to utilize the structures particularly suited to MOS implementation. As noted earlier, complex gates require no additional MOSFETS than a simple gate with the same number of inputs as discussed in connection with the logic gate generating the same signal for segment F.

Some of the reasons for blanking a seven segment display are dependent upon many variables such as information displayed, type of display and allowable power dissipation. The more common utilizations of the blanking feature are blanking the display at a high rate that is not observable which will save power and gain efficiency in some displays. Blanking can also be used for turning off a display when it is not needed or after it has been observed. Also a flashing display may be provided by the use of slow rate of blanking pulses to draw attention to the display. One of the more common uses of a blanking signal is to prevent energization of leading zeroes or zeroes to the left of the significant characters, for example, the electronic watch, for the date of less than 10 the leading zero would be blanked. The present preferred embodiment discloses use of the blanking pulses but is not concerned with the specific arrangements.

In the final stages of the decoder, including blanking as shown in FIG. 4, the blanking signal BL for decoder output A is the additional input to the complex gate which also has as inputs 4, 01 and $b1$. This is the same logical gating arrangement shown in FIG. 2 except for the addition of the blanking pulse BL to control the energization of segment A. The configuration of the decoder final stage for character segment B is the logical equivalent of that shown for FIG. 2 and includes a NAND gate in the final output stage and an input OR gate having the corresponding inputs 4, 7, $\overline{b}4$ shown in FIG. 2. This OR gate is capable of providing a high output and a high level blanking pulse $\overline{BL}$ that will disable the NAND gate to produce a low output $\overline{B}$ and a high output B to energize segment B. The final stage of logic provided for the C segment is the same as provided for B segment. The gate for segment D included a blanking input for segment A. This is also the case for obtaining the decoder output for segment F wherein the gate is unchanged from unblanked embodiment of FIG. 2 since the blanking signal is contained in the $\overline{C}$ input. The gate for segment E merely adds the blanking signal to the corresponding final logical gate shown in FIG. 2 which is also the case for the gate for segment G. As noted, the output for character segment F is identical to the corresponding final output stage of the decoder of FIG. 2 for the blanking signal BL.

While the preferred embodiment of the invention has been disclosed it should be clear that the present invention is not limited thereto as many variations will be readily apparent to those skilled in the art.

What is claimed is:

1. A character segment decoder comprising:
an intermediate decoding stage;

a final decoding stage of logical gates having inputs for coded character signals for characters of a group of characters and decoded output signals of the intermediate stage, said gates of the final stage having individual outputs corresponding to segments of a display indicator for visual display of the characters;

said intermediate stage including a plurality of logical gates having inputs for applying coded character signals representing predetermined characters of the group, each of said intermediate gates sensing a particular subcombination included in said character signals to produce intermediate logical output signals also coupled to respective logical gates of said final stage, said logical gates of the final stage being responsive to logical signals at its inputs to produce said individual outputs corresponding to segments of the display indicator for representing predetermined characters of the group of characters; and said intermediate and final stages including interconnections providing for feedback combining logical signals in final and intermediate stages for producing output signals for segments of character to display a character according to selected subcombinations of coded character signals applied to the character display indicator.

2. The character segment decoder according to claim 1 in which said predetermined characters decoded by said intermediate stage comprise characters capable of being displayed by a lesser group of segments of the display indicator than the remaining characters of the group.

3. The character segment decoder according to claim 2 in which said display indicator includes seven segments for representing any character of the group.

4. The character segment decoder according to claim 3 in which said display indicator consists of a pair of rectangles with one said segment being common to the boundary of each said rectangle and said group of characters consists of ten numbers 1 to 0.

5. The character segment decoder according to claim 1 in which said final decoding stage includes complex logical gates formed by P and N-channel transistors forming a final logical level of NOR and NAND gates and a preceding logical level of AND gates having outputs connected to the inputs of gates in the final logical level.

6. The character segment decoder of claim 5 in which said preceding logical level includes first and second logical gates in sequential stages to provide a complex logical gating network having an inverted output in said final logical level.

7. The character segment decoder of claim 1 in which a source of blanking signals is provided and coupled to said final decoding stage for blanking the outputs corresponding to the segments of the display indicator.

8. The character segment decoder of claim 1 in which said logical gates of the final decoding stage further include inputs for said outputs corresponding to segments of the display indicator for utilizing the segment outputs in combination with coded character signals and decoded output signals of the intermediate stage.

9. The character segment decoder of claim 1 in which said coded characters of the group consist of ten numbers 1 to 0, said coded character signals comprise binary coded decimal signals for numbers 1 to 0, and said final decoding stage provides for the ten numbers 1 to 0 only to produce said individual outputs corresponding to segments of the display indicator.

10. The character segment decoder of claim 1 in which said group of coded characters consists of ten numbers 1 to 0 and said predetermined characters of the group consist of numbers 4, 0, 1 and 7.

* * * * *